United States Patent Office 2,867,614
Patented Jan. 6, 1959

2,867,614

ANALOGS OF RIBOFLAVIN AND THEIR PREPARATION

Thomas Joseph Bardos and Donald B. Olsen, Chicago, Ill., assignors to Armour and Company, Chicago, Ill., a corporation of Illinois No Drawing. Application June 2, 1955
Serial No. 512,854

11 Claims. (Cl. 260—211.3)

This invention relates to structural analogs of riboflavin whch are useful as, or intermediates in the preparation of, competitive antagonists for folic-folinic acid in the biosynthesis of desoxyribonucleic acid (DNA), and to methods of preparing such riboflavin analogs.

The class of riboflavin analogs of this invention may be illustrated by the formulae

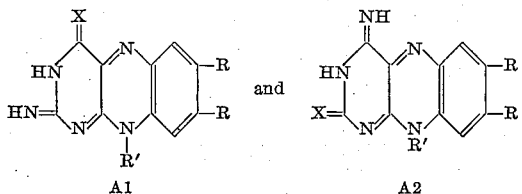

A1 and A2 and

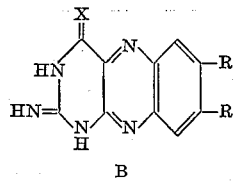

B wherein X is either an imine or an oxygen group, wherein R is an organic group having steric resemblance to a methyl radical, e. g. methyl, ethyl or halogen, and wherein R' is either an alkyl or substituted alkyl radical. The compounds represented by Formulae A1 and A2 may contain either an imino or oxygen group attached at the 2 and 4 positions, but such compounds should contain at least one of such imino groups. Since the imino or oxygen group attached at the 2 and 4 positions of these formulae are in an enolizable form, it will be understood that these formulae represent also desmotropes of these compounds.

The class of compounds represented by Formulae A1 and A2 are related to isoalloxazine. When R in such Formulae A1 and A2 is a methyl radical and X is an imino group, the class of compounds represented thereby may be designated as 2,4-diimino-2,4-desoxy-6,7-dimethyl-9-substituted isoalloxazines. Further, when R' in Formulae A1 and A2 is a ribityl radical, the compound is 2,4-diimino-2,4-desoxy riboflavin. Also, when R' in these formulae is methyl, the compound may be designated as 2,4-diimino-2,4-desoxy lumiflavin. On the other hand, when X in Formulae A1 and A2 is a hydroxyl group, the compounds represented are the corresponding 2 - imino - 2 desoxy-6,7-di-substituted-9-substituted isoalloxazine and 4-imino-2-desoxy-6,7-di-substituted-9-substituted isoalloxazine, respectively, in which the substituents at the 6 and 7 positions are either methyl, ethyl or halogen. An especially desirable class of compounds results when the substituent represented by R' in Formulae A1 and A2 is an alkyl or substituted alkyl radical containing not more than 6 carbon atoms, and an especially desirable class of compounds results when R' is a methyl, ethyl, ribityl or ribosyl radical.

The class of compounds represented by Formulae A1 and A2 may be prepared by aminating a chlorinated riboflavin analog of the structure

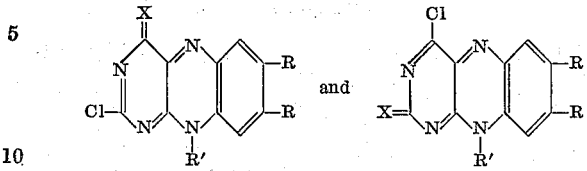

wherein X is either oxygen or a dichloro group, wherein R is a group having steric resemblance to a methyl radical, e. g. methyl, ethyl or halogen, and where R' is either an alkyl or a substituted alkyl radical. The steric configuration of the compounds represented by this formula requires a distribution of 3 chlorine atoms between the 2 and 4 positions. Thus, either the 2 or 4 position may have a dichloro substituent. In the preferred practice of this method, riboflavin may be acetylated with acetic anhydride in a pyridine medium. The resulting tetracetyl derivative of riboflavin may be chlorinated with phosphorous pentachloride in an appropriate solvent, such as phosphorous oxychloride, phosphorous trichloride, chloroform, etc. This chlorinated compound can be aminated with such ammonia reactants as alcoholic ammonia, liquified ammonia, concentrated aqueous ammonia, etc., and then de-acetylated to obtain the riboflavin analog. The chlorination of the tetracetyl derivative of riboflavin may be such as to produce either the 2-chloro-4-oxy, 4-chloro-2-oxy, or 2,4-trichloro compound. The respective chlorine derivative can be aminated and de-acetylated to produce the corresponding analog of riboflavin.

The compounds represented by Formula B may be described as analogs of alloxazine, and when X in such Formula B represents an imino group the resulting compounds may be termed 2,4-diimino-2,4-desoxy-6,7-disubstituted alloxazines, and when R is a methyl radical the compound is 2,4-diimino-2,4-desoxy lumichrome. Also, when X in Formula B is an oxygen atom the compounds represented thereby are 2-imino-2-desoxy-6,7-di-substituted alloxazines, and the corresponding 6,7-dimethyl compound is 2-imino-2-desoxy lumichrome.

The class of compounds represented by Formula B may be prepared by condensing a 2,4,5-triamino-6-substituted-pyrimidine with a 4,5-di-substituted orthobenzoquinone. The orthobenzoquinone reactant should have as substituents at the 4 and 5 positions either methyl, ethyl or halogen, while the pyrimidine reactant should have as a substituent at the 6 position either an amino or a hydroxyl group. This condensation reaction may be obtained by refluxing the reactants in an alkaline medium, e. g. a mixture of aqueous alcohol and sodium bicarbonate. This condensation reaction may also be obtained in a strong mineral or organic acid medium. However, we have found that when the reactants are refluxed in a mineral acid or strong alkaline medium the resulting condensation product may be a 2-amino-2-desoxy alloxazine analog whether the pyrimidine reactant is 2,4,5-triamino-6-hydroxy pyrimidine or 2,4,5,6-tetramino pyrimidine. Thus, in the preferred practice of this method a 2,4,5-triamino-6-substituted pyrimidine and a 4,5-di-substituted orthobenzoquinone can be condensed in an organic acid medium. Especially desirable condensation reaction results when the reactants are refluxed in an acetic acid medium.

The compounds represented by Formula B may also be prepared by condensing this orthobenzoquinone reactant with a 2-mercapto-4,5-di-amino-6-substituted pyrimidine in which the substituent at the 6 position is either an amino or hydroxyl group. The product of this reaction, a 2-thio analog of the compounds represented by Formula B, may then be alkylated, and the resulting 2-alkyl mercapto derivative reacted with ammonia to obtain the 2-imino compound.

This invention may be further illustrated by the following specific examples:

Example I 2,4-diimino-2,4-desoxy riboflavin was prepared by acetylating 10 gms. of riboflavin with an excess of acetic anhydride in pyridine. The resulting tetracetyl derivative of riboflavin was recrystallized and then dissolved in phosphorous oxychloride. The resulting solution was mixed with 10 gms. of phosphorous pentachloride and refluxed in anhydrous system for a period of 6 hours. Thereafter the excess phosphorous oxychloride was removed by distillation in vacuo. The concentrate thereby obtained was dissolved in chloroform and extracted successively with ice water and a cold sodium carbonate solution. The residual chloroform solution was subjected to evaporation and dried over anhydrous sodium sulfate. The resultant dry product was dissolved in hot alcohol. This alcohol solution was saturated with gaseous ammonia, and the introduction of ammonia gas therein was continued for a period of 5 hours while such solution was refluxed. The refluxed solution was cooled, and then concentrated ammonium hydroxide, in the amount of 20 cc. was added thereto, and the resulting mixture refluxed for a period of 1 hour. The refluxed mixture was cooled and then concentrated by distillation in vacuo. The concentrated solution was cooled whereupon a precipitate was formed. This precipitate was dried, and the melting point thereof was found to be above 300° C.

This dry product was subjected to spectrophotometric analysis, and ultraviolet absorption maxima were obtained at 270, 350 (360) and 450 m$\mu$ (flavins have characteristically 3 absorption maxima).

Example II

The activity of the 2,4-diimino-2,4-desoxy riboflavin prepared according to the method of Example I as a competitive antagonist for folic-folinic acid was tested in bacterial cultures of *Lactobacillus leichmannii*. This riboflavin analog was found to be inhibitory to the growth of this organism at a concentration of 2 mcg. per ml., and complete inhibition of growth of the organism was obtained at a concentration of 8 mcg. per ml. This inhibitory phenomenon was reversed competitively with folinic acid, and at low concentration of the riboflavin analog with folic acid. Also, the inhibitory effect of the riboflavin analog was reversed non-competitively with thymine or thymidine. These phenomena demonstrate that the riboflavin analog inhibits the biosynthesis of DNA by competing with folic-folinic acid to block the synthesis of thymine. Further, these riboflavin analogs are potentially inhibitors of riboflavin in biosynthetic processes.

Example III 2,4,5,6-tetraminopyrimidine bisulfite, in the amount of 53.1 gms. (0.24 M), was dissolved in 1.5 l. of water. The resulting solution was heated to boiling, and, while being continuously refluxed and stirred, a solution of 30.14 gms. (0.22 M) 3,4-dimethyl-1,2-benzoquinone in 200 ml. of glacial acetic acid was added, dropwise, in the course of 1 hour. Refluxing and stirring of the reaction mixture was continued for 2 additional hours. The precipitate thereupon formed in the reaction mixture was separated from the supernatant liquid by filtration. This precipitate, which was obtained in a yield of 24.2 gms. (47.5%), was purified by recrystallization from dimethylformamide. The recrystallized product was obtained in a yield of 12.2 gms. (23%).

This product was identified as 2,4-diimino-2,4-desoxy lumichrome. The composition thereof was determined by chemical analysis, and the results were as follows:

| | C | H | N |
|---|---|---|---|
| Calculated | 59.98 | 5.04 | 34.98 |
| Analyzed | 60.28 | 5.07 | 34.81 |

Ultraviolet spectrum: $\lambda$ max.=260 m$\mu$ ($\epsilon$=39,700) and 365 m$\mu$ ($\epsilon$=13,150).

Example IV 2,4,5-triamino-6-hydroxypyrimidine sulfate, in the amount of 53.0 gms. (0.13 M), was dissolved in 4 l. of water. The resulting solution was heated to boiling, and, while being continuously refluxed and stirred, a solution of 27.0 gms. (0.20 M) of 3,4-dimethyl-1,2-benzoquinone in 200 ml. of glacial acetic acid was added, drop-wise, in the course of 1 hour. Refluxing and stirring of the reaction mixture was continued for 2 additional hours. The precipitate thereupon formed was separated from the supernatant liquid by filtration. This precipitate was dissolved in boiling formic acid, and boiling water was added to the resulting solution to the point of cloudiness. This suspension was clarified by filtration, and the filtrate was concentrated to substantial dryness. This concentrate was further purified by recrystallization from 5–10% sodium hydroxide. The yield of pure product, in the form of the sodium salt, was 20.3 gms. (39%).

This product was identified as the sodium salt of 2-imino-2-desoxy lumichrome. This product was subjected to chemical analysis, and the results, based upon a formula of $C_{12}H_{10}N_5ONa$, were as follows:

| | C | H | N |
|---|---|---|---|
| Calculated | 54.75 | 3.83 | 26.61 |
| Analyzed | 53.12 | 3.88 | 26.85 |
| | 53.44 | 3.91 | 26.62 |

Ultraviolet spectrum: $\lambda$ max.=265 m$\mu$ ($\epsilon$=36,500) and 360 m$\mu$ ($\epsilon$=11,030).

Example V 2,4-diimino-2,4-desoxy riboflavin was prepared according to the method of Example I, except that chloroform was substituted for the phosphorous oxychloride employed in the chlorination reaction, and the refluxing of the resulting solution was continued for a period of 24 hours.

Example VI 2,4-diimino-2,4-desoxy riboflavin was prepared according to the method of Example I, except that amination of the chlorinated compound was obtained with liquid ammonia instead of gaseous ammonia. In this amination procedure the chlorinated compound was charged into a liquid ammonia reaction bomb. The bomb was then sealed and warmed to a temperature of 55° C., and maintained at such temperature for 4 days until the reaction had been completed.

Example VII

*Lactobacillus leichmannii* was cultured in a medium containing all nutrients essential to maximal growth of the organism. Particular amounts of 2,4-diimino-2,4-desoxy lumichrome were added to a series of culture tubes, each containing 5 ml. of this bacterial culture. These culture tubes were autoclaved for 8 minutes, then inoculated with the organism, and incubated for 16 hours at 37° C. temperature. The bacterial growth was measured by reading the turbidity of the culture in each tube with a Coleman turbidometer. The results are expressed in the following table in terms of "percent transmission."

| Concentration of 2,4-diimino-2,4-desoxy lumichrome (μg. per 5 ml.) | Turbidity reading (Percent transmission)[1] |
|---|---|
| 0 | 17 |
| 0.25 | 21 |
| 0.75 | 48 |
| 1.25 | 85 |
| 1.75 | 90 |

[1] No growth=100, maximum growth=17, half-maximum growth=59.

The obtaining of half-maximum inhibition with this compound at a concentration of approximately 0.2 m μg. per ml. indicates its high growth inhibitory activity.

*Example VIII*

Lactobacillus leichmannii was cultured according to the method of Example VII. To 5 ml. of the bacterial culture in each tube was added 5 mcg. of 2,4-diimino-2,4-desoxy lumichrome. Particular amounts of folinic acid were added to each culture tube, and the bacterial growth therein was measured after 16 hours of incubation. The results, in terms of "percent transmission," are presented in the following table:

| Concentration of folinic acid (m μg. per 5 ml.) | Turbidity readings (Percent transmission)[1] |
|---|---|
| 0 | 95 |
| 2.5 | 94 |
| 10.0 | 68 |
| 25.0 | 43 |
| 50 | 32 |
| 100 | 26 |
| 2,500 | 17 |

[1] No growth=100; maximum growth=17, half maximum growth=59 (percent transmission).

These results demonstrate that the growth inhibitory effect of 2,4-diimino-2,4-desoxy lumichrome can be reversed with folinic acid. Thus, the compound, although a structural analog of riboflavin, is surprisingly an active antagonist of another vitamin, namely, the folic-folinic acid system.

While in the foregoing specification various embodiments of this invention have been set forth and specific details elaborated for the purpose of illustration, it will be apparent to those skilled in the art that this invention is susceptible to other embodiments and that these details may be varied widely without departing from the basic concept and spirit of the invention.

We claim:
1. The structural analogs of riboflavin of the group consisting of compounds represented by the formulae

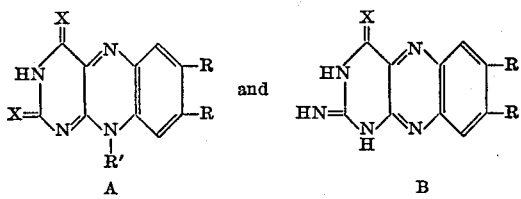

wherein X is selected from the group consisting of oxygen and an imino group, wherein R is selected from the group consisting of methyl, ethyl and halogen, wherein R' is a radical of the group consisting of alkyl and hydroxy alkyl radicals, and wherein at least one X in formula A is imino.

2. The class of structural analogs of riboflavin represented by the formula

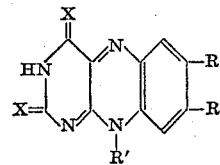

wherein X is selected from the group consisting of oxygen and imino, wherein R is selected from the grounp consisting of methyl, ethyl and halogen, wherein R' is a radical of the group consisting of alkyl and hydroxy alkyl radicals containing not more than 6 carbon atoms, and wherein at least one X is an imino group.

3. The class of structural analogs of riboflavin of claim 2 in which R' is a radical of the group consisting of methyl, ethyl, ribityl and ribosyl radicals.

4. 2,4-diimino-2,4-desoxy riboflavin and desmotropes thereof.

5. 2,4-diimino-2,4-desoxy lumiflavin.

6. 2 - imino - 2 - desoxy lumichrome and desmotropes thereof.

7. 2,4-dimino-2,4-desoxy lumichrome and desmotropes thereof.

8. 2,4 - diimino - 2,4 - desoxy - 6,7 - dimethyl - 9 - substituted isoalloxazines and desmotropes thereof in which the 9 position has as a substituent a radical of the group consisting of alkyl and substituted alkyl radicals containing not more than 6 carbon atoms.

9. 2,4 - diimino - 2,4 - desoxy - 6,7 - di-substituted alloxazines and desmotropes thereof in which the substituents at the 6 and 7 positions are selected from the group consisting of methyl, ethyl and halogen.

10. 2-imino-2-desoxy-6,7-di-substituted alloxazines and desmotropes thereof in which the substituents at the 6 and 7 positions are selected from the group consisting of methyl, ethyl and halogen.

11. The method of preparing riboflavin analogs, which comprises acetylating riboflavin to produce tetracetyl riboflavin, chlorinating the tetracetyl riboflavin to substitute chlorine for oxygen in the riboflavin and substituting at least one of the oxygen atoms thereof with chlorine, aminating the chlorinated compound to substitute amino groups for the chlorine atoms therein, and de-acetylating the aminated compound.

References Cited in the file of this patent

UNITED STATES PATENTS

| 2,350,376 | Tishler et al. | June 6, 1944 |
| 2,456,395 | Flexser et al. | Dec. 14, 1948 |
| 2,634,265 | Miller | Apr. 7, 1953 |

FOREIGN PATENTS

| 628,410 | Great Britain | Aug. 29, 1949 |

OTHER REFERENCES

Pigman: "Carbohydrate Chemistry," published by Academic Press (N. Y.), 1948 (page 182 relied on).

Karrer: "Organic Chemistry," published by Elsevier (N. Y.), 1950 (pages 617, 459 relied on).

Wagner-Zook: "Synthetic Organic Chemistry," published by John Wiley & Sons (N. Y.), 1953 (pages 665 and 666 relied on).